(12) United States Patent
Karuppaiah et al.

(10) Patent No.: US 12,091,518 B2
(45) Date of Patent: Sep. 17, 2024

(54) COMPOSITE ION EXCHANGE MEMBRANES AND METHODS OF MAKING THE SAME

(71) Applicant: Ohmium International, Inc., Newark, CA (US)

(72) Inventors: Chockkalingam Karuppaiah, Fremont, CA (US); Gokul Venugopalan, Fremont, CA (US); Arne Ballatine, Incline Village, NV (US); Jason Hixson, Soddy Daisy, TN (US)

(73) Assignee: Ohmium International, Inc., Newark, CA (US)

( * ) Notice: Subject to any disclaimer, the term of this patent is extended or adjusted under 35 U.S.C. 154(b) by 0 days.

(21) Appl. No.: 18/521,700

(22) Filed: Nov. 28, 2023

(65) Prior Publication Data

US 2024/0158591 A1     May 16, 2024

Related U.S. Application Data

(63) Continuation of application No. 18/509,078, filed on Nov. 14, 2023.

(60) Provisional application No. 63/425,224, filed on Nov. 14, 2022.

(51) Int. Cl.
| | |
|---|---|
| C08J 5/22 | (2006.01) |
| B32B 3/26 | (2006.01) |
| B32B 27/08 | (2006.01) |
| B32B 27/32 | (2006.01) |
| B32B 37/06 | (2006.01) |
| B32B 37/10 | (2006.01) |
| B32B 37/18 | (2006.01) |
| C25B 13/02 | (2006.01) |
| C25B 13/08 | (2006.01) |

(52) U.S. Cl.
CPC ............ *C08J 5/2281* (2013.01); *B32B 3/266* (2013.01); *B32B 27/08* (2013.01); *B32B 27/322* (2013.01); *B32B 37/06* (2013.01); *B32B 37/10* (2013.01); *B32B 37/182* (2013.01); *C25B 13/02* (2013.01); *C25B 13/08* (2013.01); *B32B 2250/24* (2013.01); *B32B 2305/026* (2013.01); *B32B 2307/7242* (2013.01); *B32B 2307/7376* (2023.05); *B32B 2327/18* (2013.01); *C08J 2327/18* (2013.01)

(58) Field of Classification Search
CPC ..... C08J 5/2281; C08J 2327/18; B32B 3/266; B32B 27/08; B32B 27/322; B32B 37/06; B32B 37/10; B32B 37/182; B32B 2327/18; B32B 2307/7376; B32B 2307/7242; B32B 2250/24; B32B 2305/026; C25B 13/02; C25B 13/08
USPC ......................................... 521/27
See application file for complete search history.

(56) References Cited

U.S. PATENT DOCUMENTS

| | | | | |
|---|---|---|---|---|
| 5,840,192 | A * | 11/1998 | El Moussaoui | ........ C08J 5/2243 210/639 |
| 8,669,499 | B2 | 3/2014 | Conrad | |
| 2003/0059657 | A1* | 3/2003 | Stone | .................. H01M 8/1062 429/483 |
| 2019/0077780 | A1* | 3/2019 | Shu | ...................... C07D 301/32 |
| 2019/0312293 | A1* | 10/2019 | Ramani | ............... H01M 8/1004 |
| 2022/0049367 | A1 | 2/2022 | Ballantine et al. | |
| 2023/0279564 | A1* | 9/2023 | Karuppaiah | .............. C25B 9/23 204/252 |
| 2024/0158937 | A1 | 5/2024 | Karuppaiah et al. | |

FOREIGN PATENT DOCUMENTS

| | | |
|---|---|---|
| CN | 107737614 A | 2/2018 |
| WO | 2018236649 A1 | 12/2018 |
| WO | 2022226219 A1 | 10/2022 |
| WO | 2023167924 A1 | 9/2023 |
| WO | 2024107748 A2 | 5/2024 |

OTHER PUBLICATIONS

PCT Application No. PCT/US2023/079671 International Search Report and Written Opinion dated Apr. 24, 2024.
U.S. Appl. No. 18/116,143, Chockkalingam Karuppaiah, Hydrophilic Member With Cation and Anion Conducting Membranes, filed Mar. 1, 2023.
U.S. Appl. No. 18/509,078, Chockkalingam Karuppaiah, Composite Ion Exchange Membranes and Methods of Making the Same, filed Nov. 14, 2023.
PCT Application No. PCT/US2023/014274 International Search Report and Written Opinion dated Jun. 1, 2023.
PCT Application No. PCT/US23/79671 Invitation to Pay Additional Fees dated Feb. 15, 2024.

* cited by examiner

Primary Examiner — Michael M. Bernshteyn
(74) Attorney, Agent, or Firm — Polsinelli LLP

(57) ABSTRACT

The present disclosure provides composite ion exchange membranes and methods of making the same. The composite ion exchange membranes of the present disclosure include a first layer comprising a first ion-conducting membrane; a second layer comprising a gas-blocking membrane; and a third layer comprising a second ion-conducting membrane.

18 Claims, 9 Drawing Sheets

COMPOSITE ION EXCHANGE MEMBRANES AND METHODS OF MAKING THE SAME

CROSS-REFERENCE TO RELATED APPLICATIONS

This application claims priority to and is a continuation of U.S. patent application Ser. No. 18/509,078 entitled "COMPOSITE ION EXCHANGE MEMBRANES AND METHODS OF MAKING THE SAME", filed Nov. 14, 2023, which claims priority to U.S. Provisional Application No. 63/425,224 entitled "LAMINATED ION-CONDUCTING AND GAS-BLOCKING MEMBRANE LAYERS AND METHODS OF MAKING THE SAME", filed Nov. 14, 2022, the entire contents of which are incorporated by reference herein.

FIELD OF THE DISCLOSURE

The present disclosure is related to ion-exchange membranes for use in electrolyzers and methods of making and using the same.

BACKGROUND

Electrolyzers use a polymer-based ion conducting membrane to separate ions, particularly hydrogen ions and hydroxy anions. The performance of the electrolyzer may be defined in part by the power density of the membrane, which refers to the amount of power per unit area that can be supported by the membrane at a given voltage. As power density increases, the surface area of the ion-conducting membrane is required to support the same voltage a given output of hydrogen can be reduced. Thinner ion-conducting membranes have lower resistance and thus enables increased power density. However, thinner membranes also increase the flux of hydrogen and oxygen permeation, thereby resulting in less pure gas product streams. What is needed is an ion conducting membrane with increased power density and low flux of hydrogen and oxygen permeation.

SUMMARY OF THE DISCLOSURE

Provided herein are composite ion exchange membranes. The composite ion exchange membranes of the present disclosure comprise a first layer including a first ion-conducting membrane, a second layer including a gas-blocking membrane, and a third layer including a second ion-conducting membrane. The second layer is disposed between the first layer and the third layer such that a first side of the second layer is in physical contact with the first layer and a second side of the second layer opposite to the first side is in physical contact with the third layer.

In some embodiments, the first ion-conducting membrane comprises a tetrafluoroethylene based fluoropolymer-copolymer. Preferably, the tetrafluoroethylene based fluoropolymer-copolymer has the formula $C_7HF_{13}O_5S \cdot C_nF_{2n}$, where n is an integer from 3,000 to 10,000. In some embodiments, the third ion-conducting membrane comprises a tetrafluoroethylene based fluoropolymer-copolymer. Preferably, the tetrafluoroethylene based fluoropolymer-copolymer has the formula $C_7HF_{13}O_5S \cdot C_nF_{2n}$, where n is an integer from 3,000 to 10,000.

In some embodiments, the gas-blocking membrane comprises a sulfonated polymer. Preferably, the sulfonated polymer is selected from the group consisting of sulfonated poly(ether ether ketone) (SPEEK), sulfonated phenylated poly(phenylene) (SPPP), sulfonated poly(ether sulfone) (SPES), sulfonated polystyrene-b-poly(ethylene-r-butylene)-b-polystyrene (S-SEBS), mixtures of sulfonated poly (ethylene oxide) mixed with poly(vinyl alcohol), sulfonated polystyrene cross-linked with divinyl benzene, Selemion™ CMV, Neosepta™ CMS, and Fumasep™ FKS 30. In some embodiments, the gas-blocking membrane comprises a plurality of channels, a plurality of pores, or a combination thereof.

In some embodiments, the first layer has a thickness of about 1 micron to about 50 microns. Preferably, the first layer has a thickness of about 5 microns to about 35 microns. In some embodiments, the second layer has a thickness of about 1 micron to about 50 microns. Preferably, the second layer has a thickness of about 5 microns to about 35 microns. In some embodiments, the third layer has a thickness of about 1 micron to about 50 microns. Preferably, the third layer has a thickness of about 5 microns to about 35 microns.

In some embodiments, the gas-blocking membrane further comprises a catalyst. The catalyst is preferably in the form of nanoparticles. In some aspects, the catalyst comprises platinum, palladium, gold, iridium, osmium, rhodium, ruthenium, silver, or a combination thereof. In some additional aspects, the catalyst is embedded in a surface of the gas-blocking membrane. In still further aspects, the catalyst is dispersed throughout the gas-blocking membrane.

In some embodiments, the gas-blocking membrane comprises a scaffold. The scaffold comprises a supporting polymer. In some aspects, the supporting polymer comprises poly(ether ether ketone) (PEEK).

Further provided herein are methods of making a composite ion exchange membrane. The methods generally comprise hot pressing a first layer comprising a first ion-conducting membrane, a second layer comprising a gas-blocking membrane, and a third layer comprising a second ion-conducting membrane, thereby forming the composite ion exchange membrane.

In some embodiments, the hot pressing is performed at a temperature from about 100° C. to about 300° C. Preferably, the hot pressing is performed at a temperature from about 125° C. to about 250° C.

In some embodiments, the hot pressing is performed at a pressure from about 100 psi to about 3000 psi. Preferably, the hot pressing is performed at a pressure from about 1000 psi to about 2000 psi.

In some embodiments, the hot pressing is performed for about 1 minute to about 10 minutes. Preferably, the hot pressing is performed for about 4 minutes to about 6 minutes.

In some embodiments, the method further comprises soaking the gas-blocking membrane in a solution comprising a catalyst before the hot pressing. The catalyst is preferably in the form of nanoparticles.

In some additional embodiments, the method further comprises spraying the gas-blocking membrane with a solution comprising a catalyst. The catalyst is preferably in the form of nanoparticles. In some aspects, the spraying is accomplished with an airbrush. In additional aspects, the spraying is accomplished via ultrasonic spraying. In some additional embodiments, the spraying creates a coating having a thickness of up to 0.5 microns on the gas-blocking membrane.

In still further embodiments, the method further comprises spraying the first ion-conducting membrane and/or the second ion-conducting membrane membrane with a solution comprising a catalyst. The catalyst is preferably in the form of nanoparticles. In some aspects, the spraying is accomplished with an airbrush. In additional aspects, the spraying is accomplished via ultrasonic spraying. In some additional embodiments, the spraying creates a coating having a thickness of up to 0.5 microns on the first ion-conducting membrane and/or on the second ion-conducting membrane.

Further provided herein are method of making a composite ion exchange membrane. The method generally comprises casting a first layer solution onto a substrate, the first layer solution comprising a first ion-conducting membrane resin; drying the first layer solution to form a first layer; casting a second layer solution onto the first layer, the second layer solution comprising a gas-blocking membrane resin; drying the second layer solution to form a second layer; casting a third layer solution onto the second layer, the third layer solution comprising a second ion-conducting membrane resin; and drying the third layer solution to form a third layer, thereby forming the composite ion exchange membrane.

The drying is performed at a temperature from about 50° C. to about 100° C. Preferably, the drying is performed at a temperature of about 75° C. In some embodiments, the drying occurs over night.

In some additional embodiments, the method further comprises spraying the gas-blocking membrane with a solution comprising a catalyst. The catalyst is preferably in the form of nanoparticles. In some aspects, the spraying is accomplished with an airbrush. In additional aspects, the spraying is accomplished via ultrasonic spraying. In some additional embodiments, the spraying creates a coating having a thickness of up to 0.5 microns on the gas-blocking membrane.

In still further embodiments, the method further comprises spraying the first ion-conducting membrane and/or the second ion-conducting membrane with a solution comprising a catalyst. The catalyst is preferably in the form of nanoparticles. In some aspects, the spraying is accomplished with an airbrush. In additional aspects, the spraying is accomplished via ultrasonic spraying. In some additional embodiments, the spraying creates a coating having a thickness of up to 0.5 microns on the first ion-conducting membrane and/or on the second ion-conducting membrane.

In some embodiments, the method may further include adding a catalyst to the gas-blocking membrane by immersing the gas-blocking membrane in a solution comprising a metallic salt of the catalyst; and reducing the metallic salt of the catalyst in situ.

Further provided herein is a method for making a composite ion exchange membrane. Generally, the method comprises providing a gas-blocking membrane including a first side and a second side opposite to the first side; forming pores or channels in the gas-blocking membrane; coating an ion-conducting membrane resin onto the first side of the gas-blocking layer and onto the second side of the gas-blocking layer, thereby forming the composite ion exchange membrane.

In some embodiments, the step of forming pores or channels in the gas-blocking membrane is accomplished using an optical laser.

In some embodiments, the step of forming pores or channels in the gas-blocking membrane includes: coating a pore-former composition onto the first side of the gas-blocking membrane and the second side of the gas-blocking membrane; and removing the pore former from the gas-blocking membrane, thereby creating a porous gas-blocking membrane. In some embodiments, the pore-former composition includes a gas-blocking ion conducting membrane resin and a pore-former. The pore-former may include polystyrene, a derivative of polystyrene, polyethylene oxide, a derivative of polyethylene oxide, polyvinylidene fluoride, a derivative of polyvinylidene fluoride, carbon black, silica, polyacrylic acid, N-(2-hydroxypropyl) meth acrylamide (HPMA), polyacrylamide (PAM), or a combination thereof. In some embodiments, the pore-former and the gas-blocking ion conducting membrane resin are present in the pore-former composition in a weight ratio from about 50:50 to about 90:10 of pore-former to gas-blocking ion conducting membrane resin.

Further provided herein is a method for making a composite ion exchange membrane. In general, the method comprises: immersing a gas-blocking ion-conducting membrane resin comprising a first solvent in a nonsolvent, such that the nonsolvent displaces the first solvent in the gas-blocking ion-conducting membrane resin; drying the gas-blocking ion-conducting membrane resin to form a gas-blocking membrane comprising a first side and a second side, wherein the gas-blocking membrane comprises a plurality of pores on the first side and a plurality of pores on the second side, or a plurality of channels; and coating an ion-conducting membrane resin onto the first side of the gas-blocking membrane and onto the second side of the gas-blocking membrane, thereby forming the composite ion exchange membrane.

Further provided herein is an electrolyzer comprising a composite ion exchange membrane of the present disclosure. Further provided herein is a fuel cell comprising a composite ion exchange membrane of the present disclosure. Further provided herein is an electrochemical hydrogen pump comprising a composite ion exchange membrane of the present disclosure.

DETAILED DESCRIPTION

Described herein are composite ion exchange membranes. The composite ion exchange membranes provided herein generally comprise a first layer including a first ion-conducting membrane, a second layer including a gas-blocking membrane, and a third layer including a second ion-conducting membrane. It has been surprisingly found that including a gas-blocking membrane between two ion-conducting membranes achieves an increased power density without excessive mixing of hydrogen and oxygen. Therefore, the composite ion exchange membranes of the present disclosure are thinner and achieve an increased power density as compared to ion exchange membranes of the prior art.

Figure 1A:
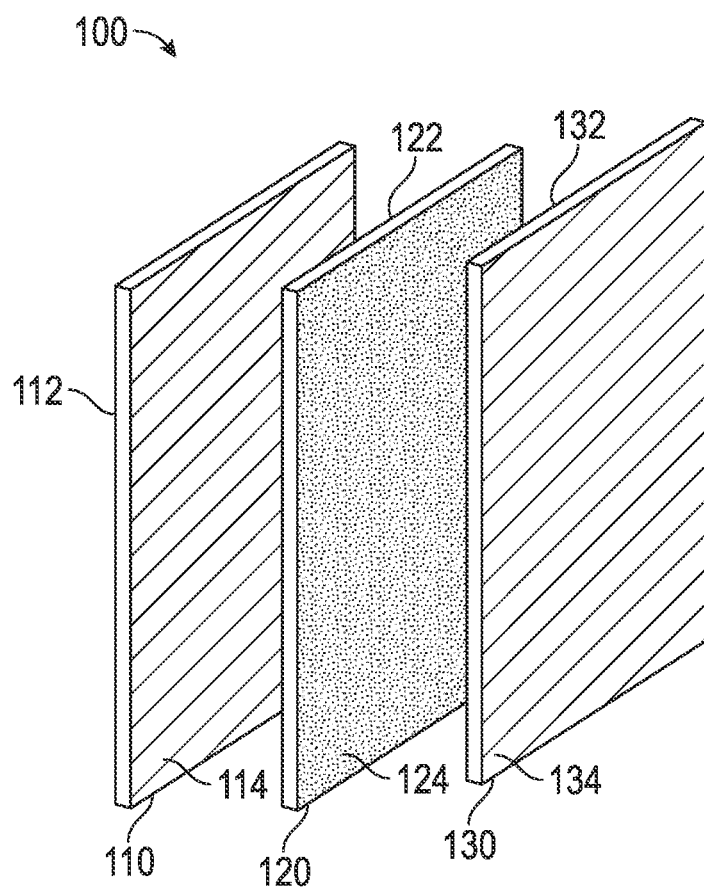
FIG. 1A is an exploded view of a composite ion exchange membrane of the present disclosure.

Referring now to FIG. 1, the composite ion exchange membrane 100 comprises a first layer 110, a second layer 120, and a third layer 130. The first layer 110 includes a first side 112 and a second side 114. The second layer 120 includes a first side 122 and a second side 124. The third layer 130 includes a first side 132 and a second side 134. The second layer 120 is disposed between the first layer 110 and the third layer 130 such that the first side 122 of the second layer 120 is in physical contact with the second side 114 of the first layer 110 and the second side 124 of the second layer 120 is in physical contact with the first side 132 of the third layer 130. Although FIG. 1 shows the ion exchange membrane 100 as having a rectangular cross-section, the cross-section of composite ion exchange membrane 100 of the present disclosure may have any shape, such as circular, elliptical, triangular, rectangular, pentagonal, hexagonal, etc.

The first layer 110 may have a thickness of about 1 micron to about 50 microns. In some embodiments, the first layer 110 may have a thickness of about 1 micron to about 5 microns, about 1 micron to about 10 microns, about 1 micron to about 15 microns, about 1 micron to about 20 microns, about 1 micron to about 25 microns, about 1 micron to about 30 microns, about 1 micron to about 35 microns, about 1 micron to about 40 microns, about 1 micron to about 45 microns, about 1 micron to about 50 microns, about 5 microns to about 50 microns, about 10 microns to about 50 microns, about 15 microns to about 50 microns, about 20 microns to about 50 microns, about 25 microns to about 50 microns, about 30 microns to about 50 microns, about 35 microns to about 50 microns, about 40 microns to about 50 microns, or about 45 microns to about 50 microns. In preferred embodiments, the first layer 100 may have a thickness of about 5 microns to about 35 microns, or about 10 microns to about 25 microns.

The second layer 120 may have a thickness of about 1 micron to about 50 microns. In some embodiments, the second layer 120 may have a thickness of about 1 micron to about 5 microns, about 1 micron to about 10 microns, about 1 micron to about 15 microns, about 1 micron to about 20 microns, about 1 micron to about 25 microns, about 1 micron to about 30 microns, about 1 micron to about 35 microns, about 1 micron to about 40 microns, about 1 micron to about 45 microns, about 1 micron to about 50 microns, about 5 microns to about 50 microns, about 10 microns to about 50 microns, about 15 microns to about 50 microns, about 20 microns to about 50 microns, about 25 microns to about 50 microns, about 30 microns to about 50 microns, about 35 microns to about 50 microns, about 40 microns to about 50 microns, or about 45 microns to about 50 microns. In preferred embodiments, the second layer 120 may have a thickness of about 5 microns to about 35 microns, or about 10 microns to about 25 microns.

The third layer 130 may have a thickness of about 1 micron to about 50 microns. In some embodiments, the third layer 130 may have a thickness of about 1 micron to about 5 microns, about 1 micron to about 10 microns, about 1 micron to about 15 microns, about 1 micron to about 20 microns, about 1 micron to about 25 microns, about 1 micron to about 30 microns, about 1 micron to about 35 microns, about 1 micron to about 40 microns, about 1 micron to about 45 microns, about 1 micron to about 50 microns, about 5 microns to about 50 microns, about 10 microns to about 50 microns, about 15 microns to about 50 microns, about 20 microns to about 50 microns, about 25 microns to about 50 microns, about 30 microns to about 50 microns, about 35 microns to about 50 microns, about 40 microns to about 50 microns, or about 45 microns to about 50 microns. In preferred embodiments, the third layer 130 may have a thickness of about 5 microns to about 35 microns, or about 10 microns to about 25 microns.

The first layer 110 and the third layer 130 of the composite ion exchange membrane 100 each include an ion-conducting membrane. The ion-conducting membrane is oxidatively stable and facilitates the transfer of ions produced in an electrolysis process by the formation of an interconnected network of hydrophilic domains upon hydration of the membrane, which allow movement of water and cations. For example, the ion-conducting membrane may be capable of conducting protons ($H^+$) and/or hydroxide ions ($OH^-$). The ion-conducting membrane is preferably cast from an ion-conducting membrane resin. Ion-conducting membranes suitable for use in the present disclosure include any suitable polymer for use in ion exchange membranes.

Preferably, the ion-conducting membrane includes a fluorinated polymer. Preferably, the ion-conducting membrane includes a non-sulfonated polymer. In some embodiments, the ion-conducting membrane may include a tetrafluoroethylene-based fluoropolymer-copolymer. In an example, the tetrafluoroethylene-based fluoropolymer-copolymer has the formula $C_7HF_{13}O_5S \cdot C_nF_{2n}$, where n is an integer from 3,000 to 10,000. In another example, the ion-conducting membrane is a Nafion™ membrane.

The first layer, the third layer, or both may further comprise a catalyst. The catalyst functions to increase reactivity of hydrogen and oxygen gas. Preferably the catalyst is in the form of nanoparticles; i.e., the catalyst may be in the form of particles having a particle size of about 100 nm or less. In preferred embodiments, the nanoparticles have an average particle size of about 10 nm. The catalyst may include one of platinum, palladium, gold, iridium, osmium, rhodium, ruthenium, silver, or a combination thereof.

In some embodiments, the catalyst may be embedded in the surface of the ion-conducting membrane via a coating technique (e.g., spray coating, blade coating, Meyer rod coating, etc.). When the catalyst is embedded in the surface via coating, the coating composition generally comprises the catalyst dispersed in an ion-conducting resin and a suitable solvent. Alternatively, the catalyst may be embedded in the surface of the ion-conducting membrane by reducing a metallic salt of the catalyst in situ and performing an ion exchange. In this embodiment, the ion-conducting membrane is immersed in a solution comprising a metallic salt of the catalyst, such as a chloride salt through a first ion exchange (e.g., a chloroplatinate salt solution for a platinum catalyst). The metallic salt is then reduced by addition of a reducing agent, thereby leaving a layer of platinum on the surface of the ion-conducting membrane. The reducing agent may include sodium borohydride, lithium aluminum hydride, sodium thiosulfate, oxalic acid, and other reducing agents known in the art and combinations thereof. A second ion exchange may then be conducted to remove byproducts of the reduction from the ion-conducting membrane. Those having ordinary skill in the art will be capable of determining the appropriate metallic salts and reducing agents to use to incorporate the catalyst. By extending the duration of the ion exchange, the catalyst may be dispersed throughout the ion-conducting membrane.

In other embodiments, the catalyst may be dispersed throughout the ion-conducting membrane. This may be accomplished by adding the catalyst to the ion-conducting membrane resin prior to casting the ion-conducting membrane.

The ion-conducting membrane may further comprise a scaffold. The scaffold comprises a supporting polymer. Supporting polymers may be any polymer suitable for adding structural integrity to a membrane without compromising suitability of the membrane for ion exchange. In particular embodiments, the supporting polymer may include poly(ether ether ketone) (PEEK), polytetrafluoroethylene (PTFE), or polyethylene polyvinylidene fluoride (PVDF). The scaffold may be in the shape of a mesh, wherein an ion-conducting membrane resin is cast onto the scaffold and dried. Thus, the scaffold is embedded within the ion-conducting membrane.

The second layer 120 of the composite ion exchange membrane 100 includes a gas-blocking membrane. The gas-blocking membrane conducts ions similar to the ion-conducting membrane, but is further operable to prevent the permeation of hydrogen and oxygen gas to the ion-conducting membranes because the solubility of hydrogen and oxygen is much lower in the gas-blocking membrane as compared to an ion-conducting membrane. The gas-blocking membrane is preferably cast from a gas-blocking ion-conducting resin. The gas-blocking membrane comprises a sulfonated polymer. Preferably, the sulfonated polymer is a sulfonated non-fluorinated polymer. Sulfonated polymers suitable for use in ion exchange membranes are generally known in the art. In preferred embodiments, the sulfonated polymer is selected from the group consisting of sulfonated poly(ether ether ketone) (SPEEK), sulfonated phenylated poly(phenylene) (SPPP), sulfonated poly(ether sulfone) (SPES), sulfonated polystyrene-b-poly(ethylene-r-butylene)-b-polystyrene (S-SEBS), mixtures of sulfonated poly(ethylene oxide) mixed with poly(vinyl alcohol), sulfonated polystyrene cross-linked with divinyl benzene, and combinations thereof. In particular examples, the sulfonated polymer may include Selemion™ CMV, Neosepta™ CMS, and Fumasep™ FKS 30, or combinations thereof.

The gas-blocking membrane may have an ion-exchange capacity from about 0.5 meq/g to about 4.0 meq/g, wherein meq/g represents the milliequivalents of ion-exchange groups included in one gram of a dry membrane. In some embodiments, the gas-blocking membrane may have an ion-exchange capacity from about 0.5 meq/g to about 1.0 meq/g, about 0.5 meq/g to about 1.5 meq/g, about 0.5 meq/g to about 2.0 meq/g, about 0.5 meq/g to about 2.5 meq/g, about 0.5 meq/g to about 3.0 meq/g, about 0.5 meq/g to about 3.5 meq/g, about 0.5 meq/g to about 4.0 meq/g, about 1.0 meq/g to about 4.0 meq/g, about 1.5 meq/g to about 4.0 meq/g, about 2.0 meq/g to about 4.0 meq/g, about 2.5 meq/g to about 4.0 meq/g, about 3.0 meq/g to about 4.0, or about 3.5 meq/g to about 4.0 meq/g.

The gas-blocking membrane may have an ionic conductivity from about 10 mS/cm to about 150 mS/cm. In some embodiments, the gas-blocking membrane may have an ionic conductivity from about 10 mS/cm to about 25 mS/cm, about 10 mS/cm to about 50 mS/cm, about 10 mS/cm to about 75 mS/cm, about 10 mS/cm to about 100 mS/cm, about 10 mS/cm to about 125 mS/cm, about 10 mS/cm to about 150 mS/cm, about 25 mS/cm to about 150 mS/cm, about 50 mS/cm to about 150 mS/cm, about 75 mS/cm to about 150 mS/cm, about 100 mS/cm to about 150 mS/cm, or about 125 mS/cm to about 150 mS/cm.

The second layer may further comprise a catalyst. The catalyst functions to increase reactivity of hydrogen and oxygen gas. Preferably the catalyst in the form of nanoparticles; i.e., the catalyst may be in the form of particles having a particle size of about 100 nm or less. In preferred embodiments, the nanoparticles have an average particle size of about 10 nm. The catalyst may include one of platinum, palladium, gold, iridium, osmium, rhodium, ruthenium, silver, or a combination thereof.

In some embodiments, the catalyst may be embedded in the surface of the gas-blocking membrane via a coating technique (e.g., spray coating, blade coating, Meyer rod coating, etc.). When the catalyst is embedded in the surface via coating, the coating composition generally comprises the catalyst dispersed in an ion-conducting resin and a suitable solvent. Alternatively, the catalyst may be embedded in the surface of the gas-blocking membrane by reducing a metallic salt of the catalyst in situ and performing an ion exchange. In this embodiment, the ion-conducting membrane is immersed in a solution comprising a metallic salt of the catalyst, such as a chloride salt through a first ion exchange (e.g., a chloroplatinate salt solution for a platinum catalyst). The metallic salt is then reduced by addition of a reducing agent, thereby leaving a layer of platinum on the surface of the gas-blocking membrane. The reducing agent may include sodium borohydride, lithium aluminum hydride, sodium thiosulfate, oxalic acid, and other reducing agents known in the art and combinations thereof. A second ion exchange may then be conducted to remove byproducts of the reduction from the gas-blocking membrane. Those having ordinary skill in the art will be capable of determining the appropriate metallic salts and reducing agents to use to incorporate the catalyst. By extending the duration of the first ion exchange, the catalyst may be dispersed throughout the gas-blocking membrane.

In other embodiments, the catalyst may be dispersed throughout the gas-blocking membrane. This may be accomplished by adding the catalyst to the gas-blocking ion-conducting membrane resin prior to casting the gas-blocking membrane.

The second layer may further comprise a scaffold. The scaffold comprises a supporting polymer. Supporting polymers may be any polymer suitable for adding structural integrity to a membrane without compromising suitability of the membrane for ion exchange. In particular embodiments, the supporting polymer may include poly(ether ether ketone) (PEEK) or polytetrafluoroethylene (PTFE). The scaffold may be in the shape of a mesh, wherein a gas blocking ion-conducting resin is cast onto the scaffold and dried.

Figure 1B:
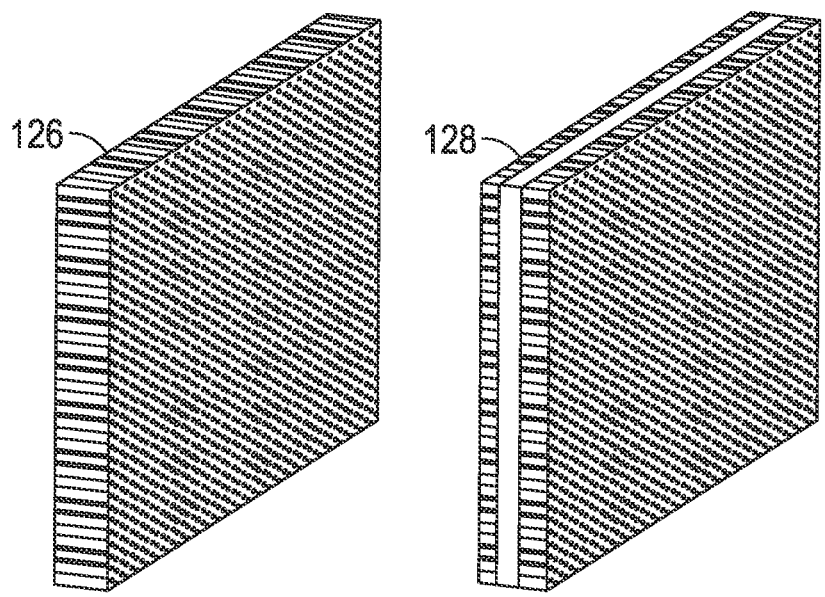
FIG. 1B shows different views of the second layer of the composite ion exchange membrane of the present disclosure.

Turning now to FIG. 1B, the second layer may be a porous second layer 128; i.e., the first side 122 and the second side 124 may comprise a plurality of pores on the surface. The pores are defined by a void space on the surface of each of the first side and the second side of the second layer. The pores may each have a depth from about 50 nm to about 1000 nm. The pores may each have a diameter from about 50 nm to about 1000 nm. In embodiments where the second layer 120 is porous, the first layer 110 and the third layer 130 may extend into the pores such that the second side 114 of the first layer 110 and the first side 132 of the third layer 130 occupy the void space of the pores. As explained in more detail herein, this arrangement increases surface-to-surface contact of the layers and helps to prevent separation of the layers.

Alternatively, as shown in FIG. 1B, the second layer may comprise a plurality of channels that extend through the width of the second layer, thereby forming a second layer having a plurality of channels 126. The channels are each defined by a void space that extends through the second layer from the first side to the second side of the second layer. In such embodiments, the first layer 110 and the third layer 130 may extend through and occupy the void space in the plurality of channels, such that the first layer and the third layer make physical contact through the each of the channels. This further helps to prevent separation of the layers. The channels may have a diameter from about 5 nm to about 1000 nm.

Those having ordinary skill in the art will appreciate that the second layer may comprise a plurality of channels, a plurality of pores, or a combination of the two.

The composite ion-exchange membranes of the present disclosure have improved properties compared to ion-exchange membranes consisting of a single ion-conducting membrane. In some embodiments, the composite ion-exchange membranes of the present disclosure have increased ion exchange capacity as compared to ion-exchange membranes consisting of a single ion-conducting membrane. For example, in some embodiments, the composite ion exchange membranes of the present disclosure have an ion exchange capacity of about 50% to about 60% greater than an ion-exchange membrane consisting of a single ion-conducting membrane.

In some embodiments, the composite ion-exchange membranes of the present disclosure have increased water uptake as compared to ion-exchange membranes consisting of a single ion-conducting membrane. For example, in some embodiments, the composite ion exchange membranes of the present disclosure have a water uptake of at least 50% greater, including up to 100% greater, than an ion-exchange membrane consisting of a single ion-conducting membrane.

In some embodiments, the composite ion-exchange membranes of the present disclosure have increased in-plane conductivity as compared to ion-exchange membranes consisting of a single ion-conducting membrane. For example, in some embodiments, the composite ion exchange membranes of the present disclosure have an in-plane conductivity of at least 30% greater, including up to 50% greater, than an ion-exchange membrane consisting of a single ion-conducting membrane.

Further described herein are methods of making a composite ion exchange membrane via lamination. The methods generally comprise laminating together: a first layer comprising a first ion-conducting membrane, a second layer comprising a gas-blocking membrane, and a third layer comprising a second ion-conducting membrane, thereby forming the composite ion exchange membrane.

The laminating step may be accomplished by any form of lamination known in the art suitable for laminating layers of ion exchange membranes. Preferred methods of lamination include hot pressing, and solution casting. Preferably, no adhesive is used in the lamination; however, adhesive may be used to keep the layers of the composite ion exchange membrane together.

Figure 2:
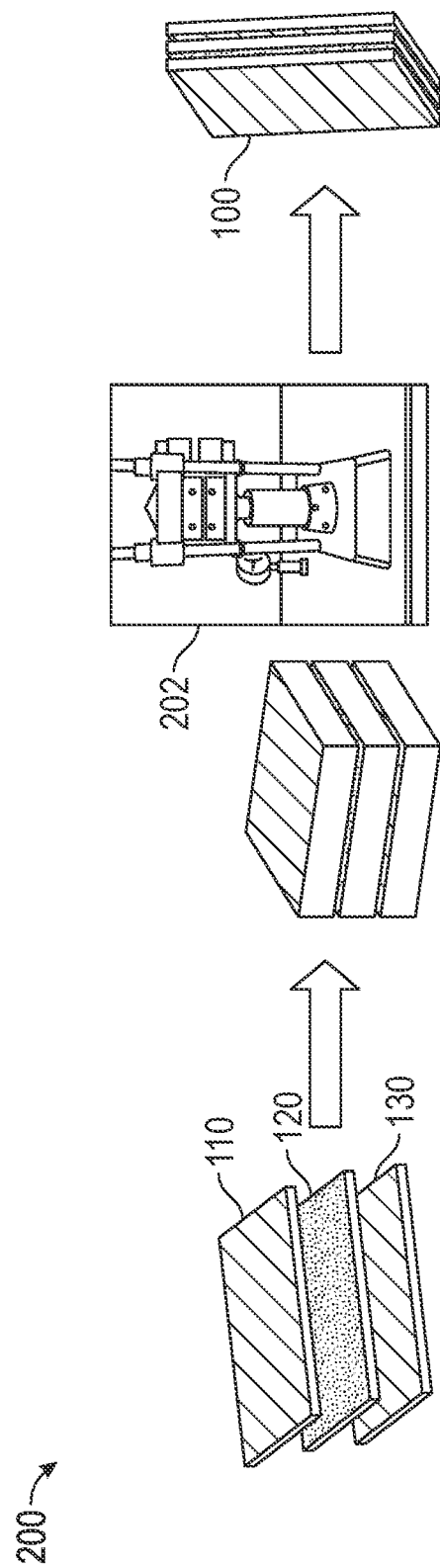
FIG. 2 shows an exemplary hot pressing method of making the composite ion exchange membranes of the present disclosure.

Further described herein are methods of making a composite ion exchange membrane via hot pressing. Hot pressing, and apparatuses and systems for performing hot pressing, are generally well known in the art. Referring now to FIG. 2, the method 200 generally comprises hot pressing 202 a first layer 110 comprising a first ion-conducting membrane, a second layer 120 comprising a gas-blocking membrane, and a third layer 130 comprising a second ion-conducting membrane, thereby forming the composite ion exchange membrane 100. As shown in FIG. 2, the hot press may be a static hot press. However, a roller hot press and other hot presses known in the art may also be used in the methods of the present disclosure.

The hot pressing may be performed at a temperature from about 100° C. to about 300° C. In some embodiments, the hot pressing may be performed at a temperature from about 100° C. to about 125° C., about 100° C. to about 150° C., about 100° C. to about 175° C., about 100° C. to about 200° C., about 100° C. to about 225° C., about 100° C. to about 250° C., about 100° C. to about 275° C., about 100° C. to about 300° C., about 125° C. to about 300° C., about 150° C. to about 300° C., about 175° C. to about 300° C., about 200° C. to about 300° C., about 225° C. to about 300° C., about 250° C. to about 300° C., or about 275° C. to about 300° C. In some examples, the hot pressing may be performed at a temperature of about 125° C. to about 250° C.

The hot pressing may be performed at a pressure from about 100 psi to about 3000 psi. In some embodiments, the hot pressing may be performed at a pressure from about 100 psi to about 500 psi, about 100 psi to about 1000 psi, about 100 psi to about 1500 psi, about 100 psi to about 2000 psi, about 100 psi to about 2500 psi, about 100 psi to about 3000 psi, about 500 psi to about 3000 psi, about 1000 psi to about 3000 psi, about 1500 psi to about 3000 psi, about 2000 psi to about 3000 psi, about 2500 psi to about 3000 psi, or about 1000 psi to about 2000 psi.

The hot pressing may be performed for about 1 minute to about 10 minutes. In some embodiments, the hot pressing may be performed for about 1 minute to about 2 minutes, about 1 minute to about 4 minutes, about 1 minute to about 6 minutes, about 1 minute to about 8 minutes, about 1 minute to about 10 minutes, about 2 minutes to about 10 minutes, about 4 minutes to about 10 minutes, about 6 minutes to about 10 minutes, or about 8 minutes to about 10 minutes. In some examples, the hot pressing may be performed for about 4 minutes to about 6 minutes.

Figure 4:
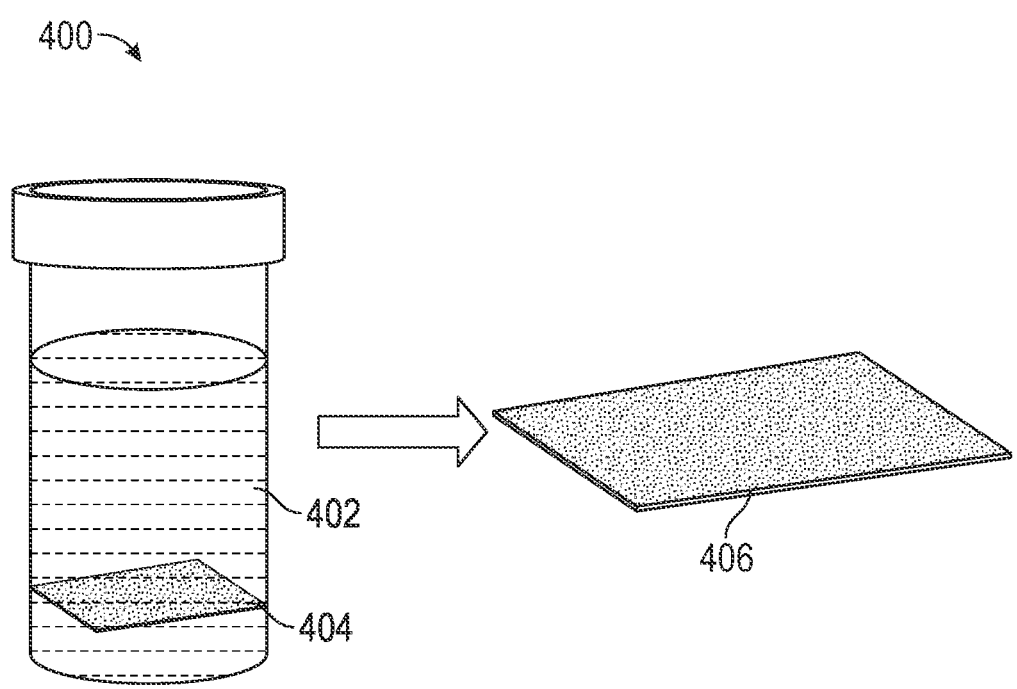
FIG. 4 shows an exemplary method of adding a catalyst to a gas-blocking membrane.

The method may further comprise adding a catalyst to the gas-blocking membrane before hot pressing the layers together. Referring now to FIG. 4, the step 400 of adding the catalyst to the gas-blocking membrane 404 may comprise soaking the gas-blocking membrane 404 in a solution 402 comprising the catalyst. The solution may include the catalyst in the form of a catalyst salt. The catalyst may be any catalyst described herein. In a non-limiting example, the catalyst may include platinum and the solution may include chloroplatinic acid ($H_2PtCl_6$). As the gas-blocking membrane soaks in the catalyst solution, the catalyst incorporates into the gas-blocking membrane, thus forming a catalyst-doped gas-blocking membrane 406. When the catalyst is added in this manner, the catalyst is dispersed throughout the gas-blocking membrane. This step 400 is preferably performed before the hot pressing step.

Figure 5A:
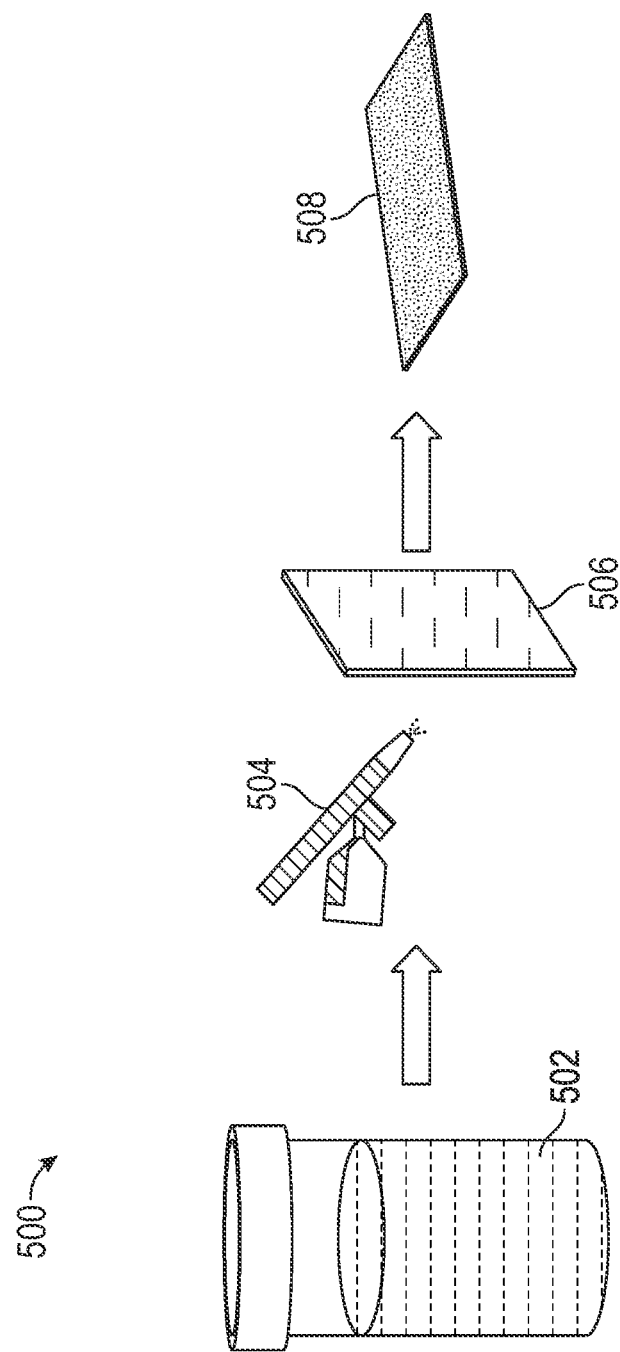
FIGS. 5A and 5B show exemplary methods of spray coating a catalyst on a gas-blocking membrane (FIG. 5A) and an ion-conducting membrane (FIG. 5B).

Alternatively, the catalyst may be added to the gas-blocking membrane via spray coating. Referring now to FIG. 5A, the step 500 of adding the catalyst to the gas-blocking membrane 506 is accomplished by spraying a solution 502 comprising a catalyst using a sprayer 504, thereby forming a catalyst-coated gas-blocking membrane 508. The solution 502 may include any catalyst described herein, and may be in the form of a catalyst ink. Preferably, the catalyst is in the form of nanoparticles. The solution 502 may be spray coated onto one or more surfaces of the gas-blocking membrane 506 using a sprayer 504, such as an air brush, an ultrasonic sprayer, or other devices suitable for spray coating known in the art. This step 500 results in a catalyst-coated gas-blocking membrane, wherein the catalyst is embedded in or adhered to the surface of the gas-blocking membrane. The catalyst coating may have a thickness of about 0.5 microns on the gas-blocking membrane. This step 500 is preferably performed before the hot pressing step.

Figure 5B:
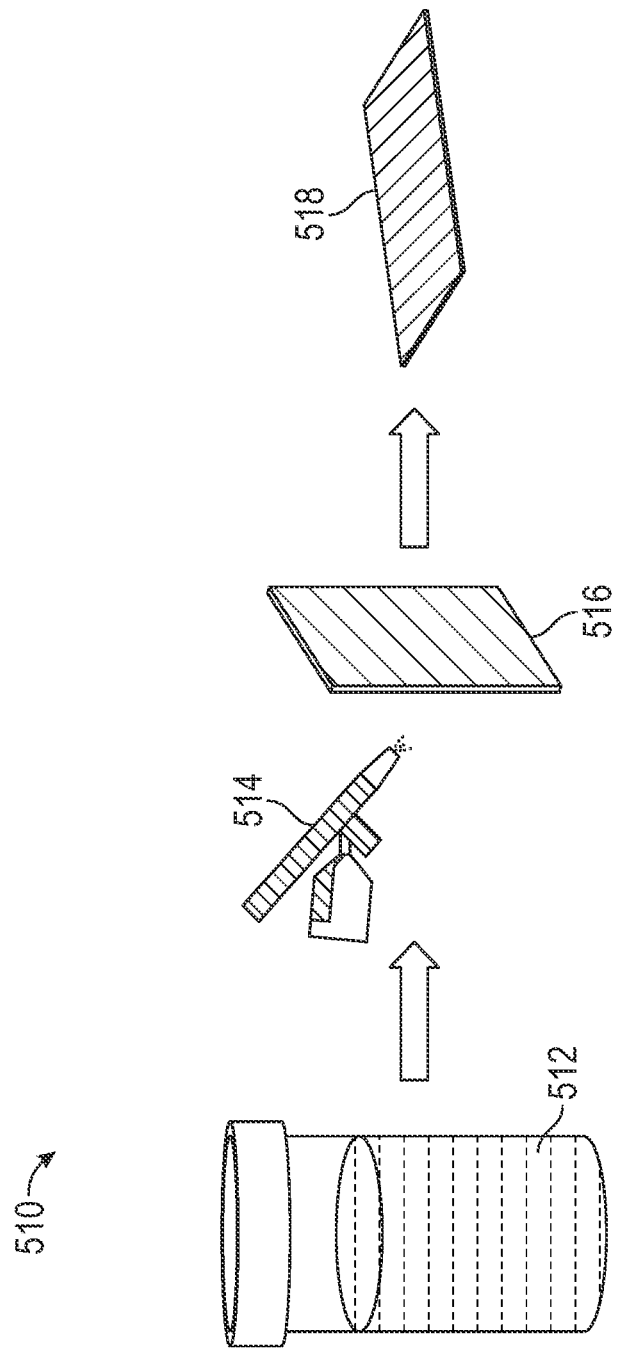

Additionally, the catalyst may be added to the first ion-conducting membrane and/or the second ion-conducting membrane via spray coating. Referring now to FIG. 5B, the step 510 of adding the catalyst to the gas-blocking membrane 516 is accomplished by spraying a solution 512 comprising a catalyst using a sprayer 514, thereby forming a catalyst-coated ion-conducting membrane 518. The solution 512 may include any catalyst described herein, and may be in the form of a catalyst ink. Preferably, the catalyst is in the form of nanoparticles. The solution 512 may be spray coated onto one or more surfaces of the ion-conducting membrane 516 using a sprayer 514, such as an air brush, an ultrasonic sprayer, or other devices suitable for spray coating known in the art. This step 510 results in a catalyst-coated ion-conducting membrane, wherein the catalyst is embedded in or adhered to the surface of the ion-conducting membrane. The catalyst coating may have a thickness of about 0.5 microns on the ion-conducting membrane. This step 510 is preferably performed before the hot pressing step.

Figure 3:
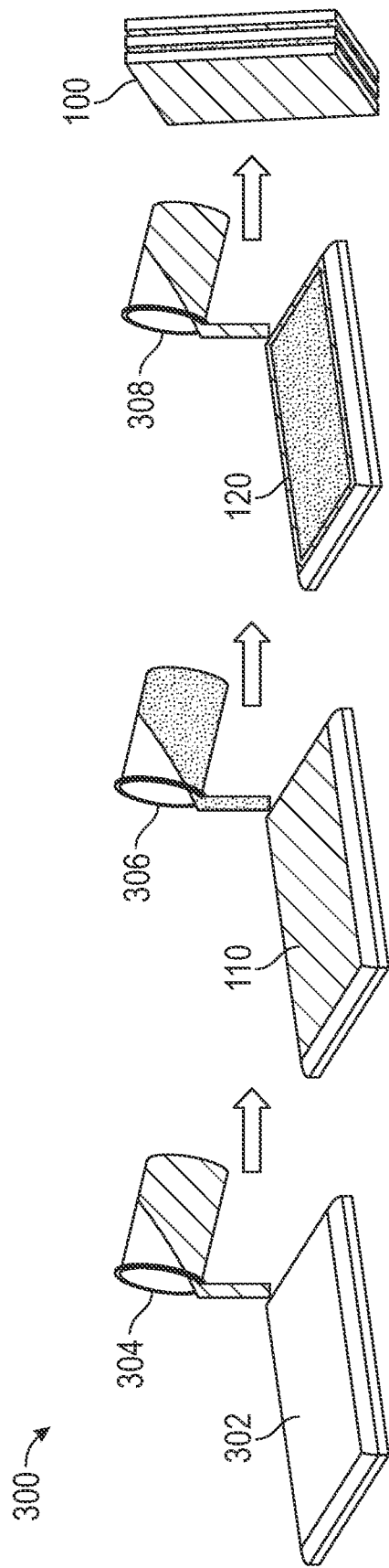
FIG. 3 shows an exemplary solution casting method of making the composite ion exchange membranes of the present disclosure.

Further provided herein are methods of making a composite ion exchange membrane via solution casting. Referring now to FIG. 3, the method 300 generally comprises casting a first layer solution 304 onto a substrate 302; drying the first layer solution 304 to form a first layer 110; casting a second layer solution 306 onto the first layer 110; drying the second layer solution 306 to form a second layer 120; casting a third layer solution 308 onto the second layer 120; and drying the third layer solution 308 to form a third layer 130 (not shown in FIG. 3). After the third layer 130 is dried, the composite ion exchange membrane 100 is formed.

The first layer solution may include a first ion-conducting membrane resin and the third layer solution may include a second ion-conducting membrane resin. An ion-conducting membrane resin is a liquid that, when dried, forms an ion-conducting membrane as described hereinabove. The ion-conducting membrane resin may include any suitable polymer for use in ion exchange membranes. Preferably, the ion-conducting membrane resin includes a fluorinated polymer. In some embodiments, the ion-conducting membrane resin may include a tetrafluoroethylene-based fluoropolymer-copolymer. In an example, the tetrafluoroethylene-based fluoropolymer-copolymer has the formula $C_7HF_{13}O_5S \cdot C_nF_{2n}$, where n is an integer from 3,000 to 10,000.

The second layer solution may include a gas-blocking membrane resin. A gas-blocking membrane resin is a liquid that, when dried, forms a gas-blocking membrane of the present disclosure. The gas-blocking membrane resin comprises a sulfonated polymer. Preferably, the sulfonated polymer is a sulfonated non-fluorinated polymer. Sulfonated polymers suitable for use in ion exchange membranes are generally known in the art. In preferred embodiments, the sulfonated polymer is selected from the group consisting of sulfonated poly(ether ether ketone) (SPEEK), sulfonated phenylated poly(phenylene) (SPPP), sulfonated poly(ether sulfone) (SPES), sulfonated polystyrene-b-poly(ethylene-r-butylene)-b-polystyrene (S-SEBS), mixtures of sulfonated poly(ethylene oxide) mixed with poly(vinyl alcohol), sulfonated polystyrene cross-linked with divinyl benzene, and combinations thereof. In particular examples, the sulfonated polymer may include Selemion™ CMV, Neosepta™ CMS, and Fumasep™ FKS 30, or combinations thereof.

Each of the drying steps may occur at a temperature from about 50° C. to about 100° C. In some embodiments, the drying may occur at a temperature from about 50° C. to about 60° C., about 50° C. to about 70° C., about 50° C. to about 80° C., about 50° C. to about 90° C., about 50° C. to about 100° C., about 60° C. to about 100° C., about 70° C. to about 100° C., about 80° C. to about 100° C., or about 90° C. to about 100° C. In some examples, the drying occurs at a temperature of about 75° C.

The drying may occur over night. Alternatively, the drying may occur over a period from about 8 hours to about 24 hours.

The method may further comprise adding a catalyst to the first ion-conducting membrane, the second ion-conducting membrane, and/or to the gas-blocking membrane after each of the first layer, the second layer, and/or the third layer dries. This may be accomplished by spraying the membrane as described above and as shown in FIGS. 5A and 5B.

Figure 6:
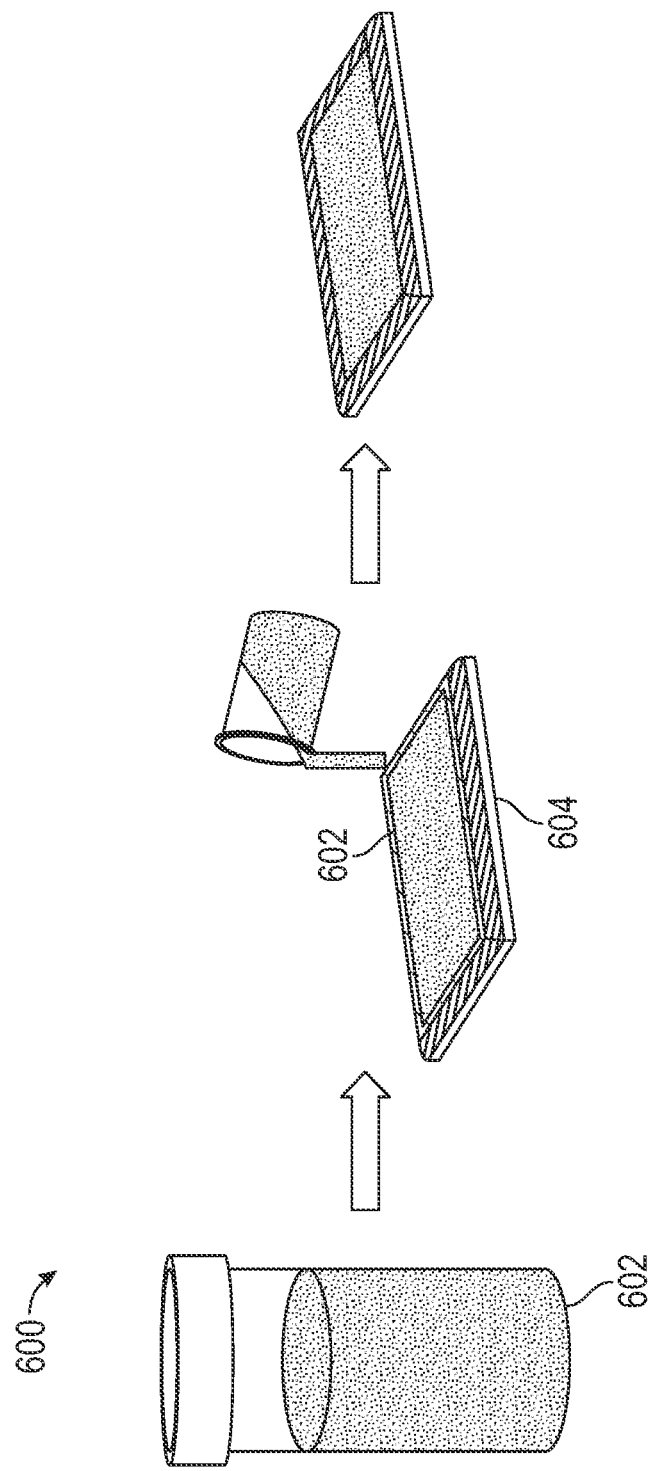
FIG. 6 shows an exemplary method of making a gas-blocking membrane that includes a scaffold.

The method may further comprise placing a scaffold on the first layer prior to casting the second layer solution. Referring now to FIG. 6, the step 600 includes casting the second layer solution 602 onto a scaffold 604. The scaffold 604 may be any scaffold described hereinabove.

Further described herein are methods of making a composite ion exchange membrane of the present disclosure via coating. The method generally comprises providing a gas-blocking membrane comprising a first side and a second side opposite to the first side; coating a pore-former composition comprising a gas-blocking ion-conducting resin and a pore-former onto the first side and the second side of the gas-blocking membrane; removing the pore-former, thereby forming a porous gas-blocking membrane; and coating an ion-conducting membrane resin on the first side and the second side of the gas-blocking membrane, thereby forming a composite ion exchange membrane of the present disclosure.

Figure 7:
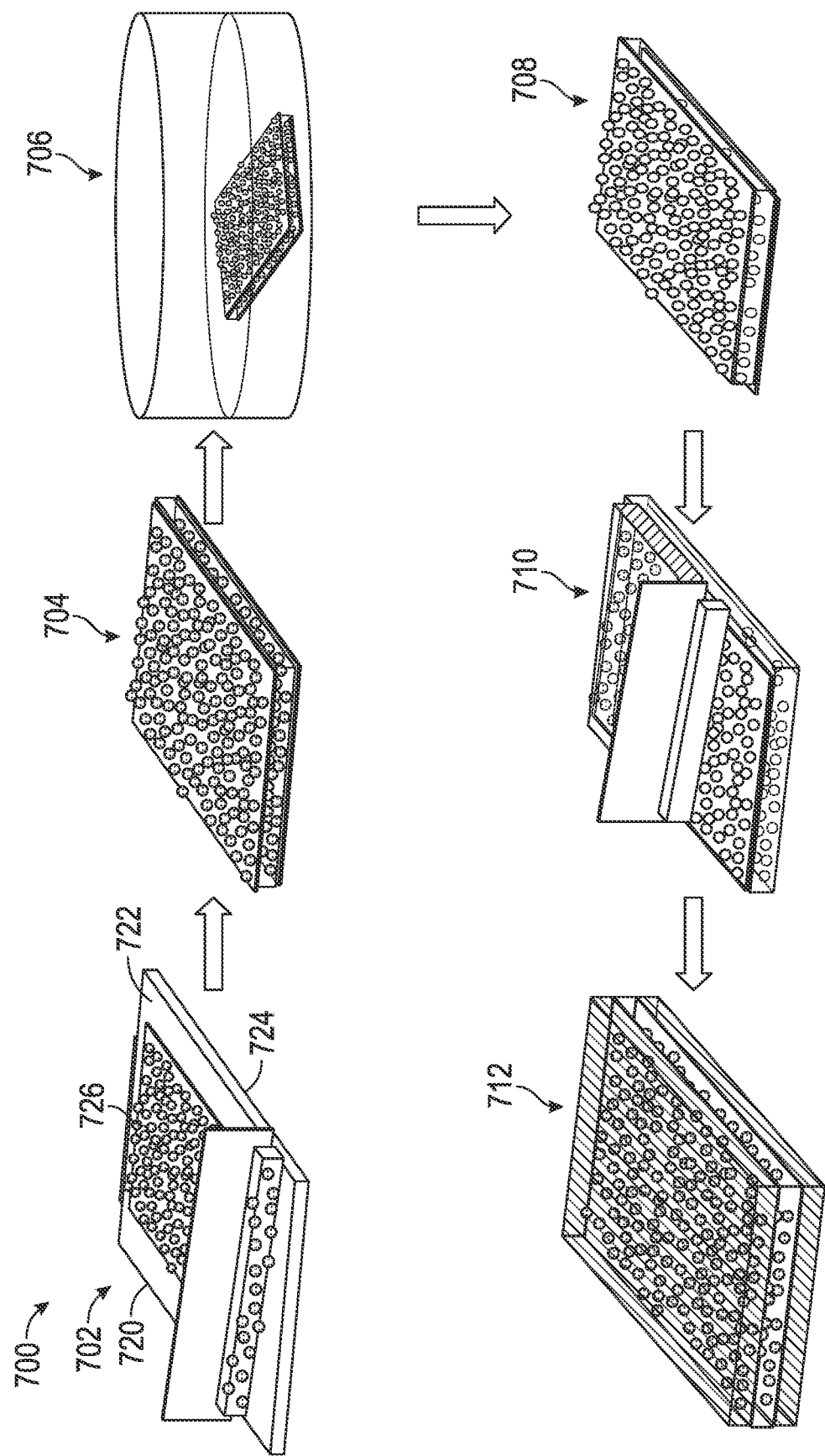
FIG. 7 shows an exemplary method of making a composite ion-exchange membrane of the present disclosure.

Turning now to FIG. 7, an exemplary process 750 for making a composite ion exchange membrane of the present disclosure is shown. In step 752, a gas-blocking membrane 720 including a first side 722 and a second side 724 is provided. The gas-blocking membrane 720 is coated with a pore-former composition 726. The coating may be accomplished using a doctor blade as shown in FIG. 7, but other methods of coating as described previously herein may also be used, so long as a uniform thickness of the pore-former composition is achieved.

The pore-former composition 726 comprises or consists of a pore former dispersed in a gas-blocking ion conducting membrane resin as described hereinabove and a suitable solvent. Preferably, the gas-blocking ion conducting membrane resin has the same chemical identity as the gas-blocking membrane 720, but in some embodiments, the gas-blocking ion conducting membrane resin has a different chemical identity.

The pore-former generally includes one or more polymers that are capable of remaining suspended in the pore-former composition. Pore-formers suitable for use in the present disclosure include polystyrene and derivatives of polystyrene, polyethylene oxide and derivatives of polyethylene oxide, polyvinylidene fluorine and derivatives of polyvinylidene fluorine, carbon black, silica, polyacrylic acid, N-(2-hydroxypropyl) meth acrylamide (HPMA), polyacrylamide (PAM), and combinations thereof. The pore-former may have an average particle diameter from about 50 nm to about 1000 nm.

The solvent may include any solvent capable of dissolving the gas-blocking ion-conducting membrane resin, but incapable of dissolving the pore-former. In some examples, the solvent may include ethanol, isopropyl alcohol, deionized water, glycerol, ethylene glycol, dimethyl acetamide, dimethyl sulfoxide, or a combination thereof.

The amount of pore-former included in the pore-former composition may be adjusted to control the porosity of the porous gas-blocking membrane. The pore-former may be present in the pore-former composition in a ratio of pore-former to gas-blocking ion conducting membrane resin from about 50:50 to about 90:10 by weight. For example, the pore-former may be present in the pore-former composition in a ratio of pore-former to gas-blocking ion conducting membrane resin from about 50:50 to about 60:40, about 50:50 to about 70:30, about 50:50 to about 80:20, about 50:50 to about 90:10, about 60:40 to about 90:10, about 70:30 to about 90:10, or about 80:20 to about 90:10.

The pore-former composition may be coated in step 752 at a temperature from about 0° C. to about 120° C. For example, the pore-former composition may be coated at a temperature from about 0° C. to about 20° C., about 0° C. to about 40° C., about 0° C. to about 60° C., about 0° C. to about 80° C., about 0° C. to about 100° C., about 0° C. to about 120° C., about 20° C. to about 120° C., about 40° C. to about 120° C., about 60° C. to about 120° C., about 80° C. to about 120° C., about 100° C. to about 120° C., about 20° C. to about 100° C., or about 40° C. to about 80° C.

The thickness of the coated pore-former composition may be from about 5 μm to about 20 μm on each side of the gas-blocking membrane 720. For example, the thickness of the coated pore-former composition may be from about 5 μm to about 10 μm, about 5 μm to about 15 μm, about 5 μm to about 20 μm, about 10 μm to about 20 μm, or about 15 μm to about 20 μm. The gas-blocking membrane 720 may have a thickness as described hereinabove.

In step 754, the coated gas-blocking membrane 720 is dried. The coated gas-blocking membrane may be dried in an oven or any suitable drying apparatus. The gas-blocking membrane 720 may be dried at atmospheric pressure at a temperature from about 25° C. to about 120° C. For example, the gas-blocking membrane 720 may be dried at a temperature from about 25° C. to about 50° C., about 25° C. to about 75° C., about 25° C. to about 100° C., about 25° C. to about 120° C., about 50° C. to about 120° C., about 75° C. to about 120° C., about 100° C. to about 120° C., or about 50° C. to about 100° C.

In some embodiments, both sides of the gas-blocking membrane 720 may be coated with the pore-former composition in step 752 before drying in step 754. In other embodiments, one side of the gas-blocking membrane 720 may be coated with the pore-former composition in step 752 and then dried in step 754, and then repeating step 752 by coating the other side of the gas-blocking membrane 720 with the pore-former composition and then repeating the drying step 754.

In step 756, the coated gas-blocking membrane 720 is soaked in a removal solvent capable of dissolving the pore-former but incapable of dissolving the gas-blocking membrane and the gas-blocking ion conducting membrane resin. Step 756 may be accomplished by simply soaking the gas-blocking membrane 720 in the removal solvent, spraying the removal solvent onto the gas-blocking membrane 720, or otherwise contacting the removal solvent with the gas-blocking membrane 720 in sufficient amounts to completely dissolve the pore-former, thereby leaving no pore-former or substantially no pore-former left on the gas-blocking membrane 720. The resulting porous gas-blocking membrane has the structure of the porous second layer 128 shown in FIG. 1B.

The removal solvent includes any solvent capable of dissolving the pore-former and incapable of dissolving the gas-blocking ion conducting membrane resin. The removal solvent may include a polar organic solvent, a non-polar organic solvent, an aqueous solvent, or a combination thereof. In some examples, the removal solvent may include a hydrocarbon solvent such as toluene or xylenes (including meta-, ortho-, and para xylene), acetone, methanol, water, etc.

After the removal solvent dissolves the pore-former, a porous surface is left behind on the first side 722 and the second side 724 of the gas-blocking membrane 720. The porous surface may have a thickness from about 1 μm to about 10 μm. The thickness may be uniform throughout the surface of the gas-blocking membrane. For example, the porous surface may have a thickness from about 1 μm to about 2 μm, about 1 μm to about 4 μm, about 1 μm to about 6 μm, about 1 μm to about 8 μm, about 1 μm to about 10 μm, about 2 μm to about 10 μm, about 4 μm to about 10 μm, about 6 μm to about 10 μm, about 8 μm to about 10 μm, or about 2 μm to about 8 μm.

In step 758, the coated gas-blocking membrane 720 is dried to remove any residual solvent. The coated gas-blocking membrane may be dried in an oven or any suitable drying apparatus. The gas-blocking membrane 720 may be dried at atmospheric pressure at a temperature from about 25° C. to about 120° C. For example, the gas-blocking membrane 720 may be dried at a temperature from about 25° C. to about 50° C., about 25° C. to about 75° C., about 25° C. to about 100° C., about 25° C. to about 120° C., about 50° C. to about 120° C., about 75° C. to about 120° C., about 100° C. to about 120° C., or about 50° C. to about 100° C.

In step 760, a first ion-conducting membrane resin is coated onto the first side 722 of the gas-blocking membrane 720 and a second ion-conducting membrane resin is coated onto the second side 724 of the gas-blocking membrane 720. The first ion-conducting membrane resin and the second ion-conducting membrane resin may include any of the ion-conducting membrane resins described herein. Preferably, the first ion-conducting membrane resin and the second ion-conducting membrane resin may have the same chemical identity; although, in some embodiments, the first ion-conducting membrane and the second ion-conducting membrane may have different chemical identities. As the ion-conducting membrane resins are coated onto the first side 722 and the second side 724 of the gas-blocking layer, the ion-conducting membrane resins fill the pores left behind after removal of the pore-former.

The thickness of the first ion-conducting membrane resin and the thickness of the second ion-conducting membrane resin may be any thickness of the ion-conducting membrane layers described herein. Preferably, the thickness of the first ion-conducting membrane resin is the same of the second ion-conducting membrane resin; although, in some embodiments, the thickness of the first ion-conducting membrane resin may be different from the thickness of the second ion-conducting membrane resin.

In step 762, the coated gas-blocking membrane 720 is dried to dry the ion-conducting membrane resins, thereby forming the composite ion exchange membrane. The coated gas-blocking membrane may be dried in an oven or any suitable drying apparatus. The gas-blocking membrane 720 may be dried at atmospheric pressure at a temperature from about 25° C. to about 120° C. For example, the gas-blocking membrane 720 may be dried at a temperature from about 25° C. to about 50° C., about 25° C. to about 75° C., about 25° C. to about 100° C., about 25° C. to about 120° C., about 50° C. to about 120° C., about 75° C. to about 120° C., about 100° C. to about 120° C., or about 50° C. to about 100° C.

In some embodiments, both sides of the gas-blocking membrane 720 may be coated with the ion-conducting membrane resin in step 760 before drying in step 762. In other embodiments, one side of the gas-blocking membrane 720 may be coated with the ion-conducting membrane resin in step 760 and then dried in step 762, and then repeating step 760 by coating the other side of the gas-blocking membrane 720 with the ion-conducting membrane resin and then repeating the drying step 762.

This method of making the composite ion-exchange membranes of the present disclosure is particularly advantageous due to the formation of the pores in the gas-blocking membrane. When in use, the gas-blocking membrane 720 swells in the presence of water, thereby increasing contact of the gas-blocking membrane 720 with the ion-conducting membranes and reducing the likelihood of delamination.

Further described herein are methods of making a composite ion exchange membrane of the present disclosure. The method generally comprises providing a gas-blocking membrane comprising a first side and a second side opposite to the first side; forming pores or channels in the gas-blocking membrane; and coating an ion-conducting membrane resin on the first side and the second side of the gas-blocking membrane, thereby forming a composite ion exchange membrane of the present disclosure. The gas-blocking membrane may have the chemical identity, thickness, and other properties as discussed previously herein.

The pores may be formed as described above with respect to the process shown in FIG. 7 by use of a pore-former composition.

Figure 8:
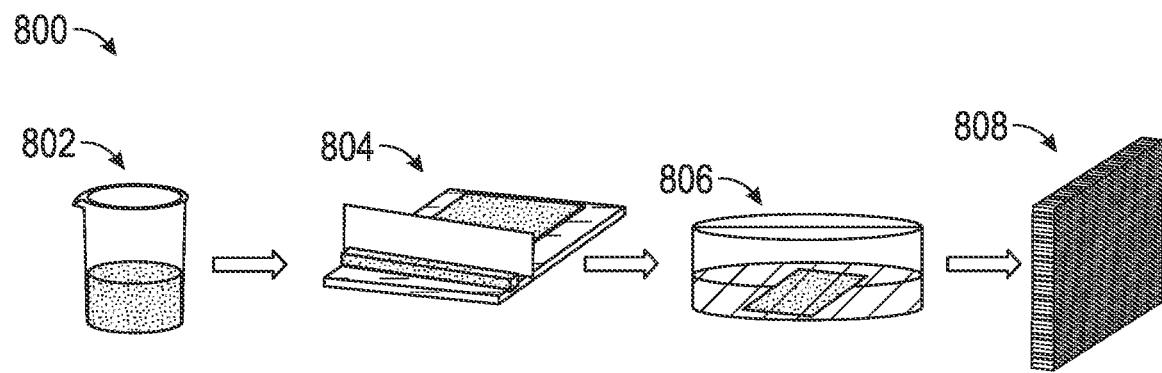
FIG. 8 shows an exemplary method of preparing a gas-blocking membrane for use in a composite ion exchange membrane of the present disclosure.

In one embodiment, a nonsolvent phase separation process may be used to form channels in the gas-blocking membrane. Referring now to FIG. 8, the process 800 begins at step 802 by providing a gas-blocking ion conducting membrane resin dissolved in a first solvent. The first solvent may include isopropyl alcohol, ethanol, glycerol, ethylene glycol, dimethyl sulfoxide, dimethyl acetamide, or any combination thereof. The gas-blocking ion conducting membrane resin may be any gas-blocking ion conducting membrane resin described herein.

The process 800 proceeds at step 804 by casting the gas-blocking ion conducting membrane resin dissolved in the first solvent to form the gas-blocking polymer layer. The first solvent remains encased or embedded in the gas-blocking membrane.

The process 800 proceeds at step 806 by immediately immersing the gas-blocking membrane resin in a bath comprising a nonsolvent. The nonsolvent displaces the first solvent in the gas-blocking membrane, but does not dissolve the gas-blocking membrane itself. Once the first solvent is fully displaced, channels and pores are left in the gas-blocking membrane. The non-solvent may include water, toluene, xylenes, acetone, an alcohol (e.g., isopropyl alcohol, n-propyl alcohol, n-octanol), or combinations thereof. Step 806 may occur for a duration from about 1 hour to about 24 hours.

In step 808, the process ends by drying the gas-blocking membrane to remove any residual nonsolvent. The gas-blocking membrane may be dried at atmospheric pressure at a temperature from about 60° C. to about 120° C. For example, the gas-blocking membrane may be dried at a temperature from about 60° C. to about 80° C., about 60° C. to about 100° C., about 60° C. to about 120° C., about 80° C. to about 120° C., about 100° C. to about 120° C., or about 80° C. to about 100° C.

Figure 9:
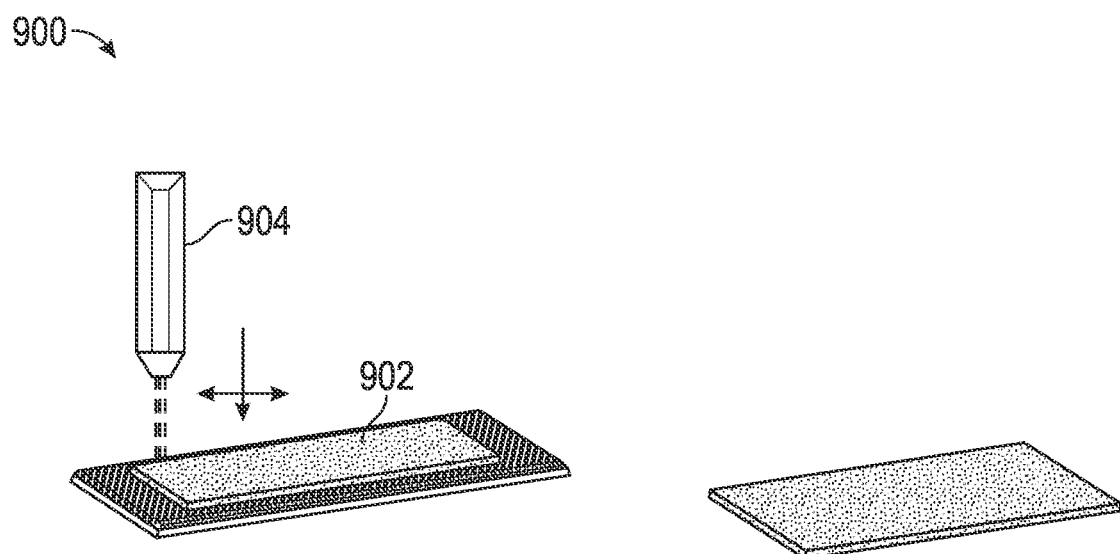
FIG. 9 shows an exemplary method of preparing a gas-blocking membrane for use in a composite ion exchange membrane of the present disclosure using an optical laser.

Alternatively, pores or channels may be formed using an optical laser as shown in FIG. 9. This allows more precise control over the size, depth, and distance between the pores and channels. Optical lasers suitable for fabricating ion exchange membranes and methods of procuring the same are generally known to those having ordinary skill in the art. In a particular non-limiting example, the laser may be a carbon-dioxide based laser with an infrared wavelength (e.g., about 10 microns), a pulse duration from 5 to 200 microseconds, and a maximum fluence of about 350 J/cm$^2$. Those of ordinary skill in the art will be capable of determining other laser configurations that are useful in the methods described herein.

The method 900 comprises directing the beam from an optical laser 904 onto a gas-blocking membrane 902 to form pores or channels. The optical laser 904 is capable of moving along three axes with respect to the gas-blocking membrane 902. The optical laser 904 is thus capable of controlling the shape, size, and depth of the pores or channels. The optical laser 904 may be programmed to form a predetermined layout of pores or channels.

After the forming the pores or channels, a first ion-conducting membrane resin is coated onto the first side of the gas-blocking membrane and a second ion-conducting membrane resin is coated onto the second side of the gas-blocking membrane. The first ion-conducting membrane resin and the second ion-conducting membrane resin may include any of the ion-conducting membrane resins described herein. Preferably, the first ion-conducting membrane resin and the second ion-conducting membrane resin may have the same chemical identity; although, in some embodiments, the first ion-conducting membrane and the second ion-conducting membrane may have different chemical identities. As the ion-conducting membrane resins are coated onto the first side and the second side of the gas-blocking layer, the ion-conducting membrane resins fill the pores left behind after removal of the pore-former.

The thickness of the first ion-conducting membrane resin and the thickness of the second ion-conducting membrane resin may be any thickness of the ion-conducting membrane layers described herein. Preferably, the thickness of the first ion-conducting membrane resin is the same of the second ion-conducting membrane resin; although, in some embodiments, the thickness of the first ion-conducting membrane resin may be different from the thickness of the second ion-conducting membrane resin.

The coated gas-blocking membrane is then dried to dry the ion-conducting membrane resins, thereby forming the composite ion exchange membrane. The coated gas-blocking membrane may be dried in an oven or any suitable drying apparatus. The gas-blocking membrane may be dried at atmospheric pressure at a temperature from about 25° C. to about 120° C. For example, the gas-blocking membrane 720 may be dried at a temperature from about 25° C. to about 50° C., about 25° C. to about 75° C., about 25° C. to about 100° C., about 25° C. to about 120° C., about 50° C. to about 120° C., about 75° C. to about 120° C., about 100° C. to about 120° C., or about 50° C. to about 100° C.

In some embodiments, both sides of the gas-blocking membrane may be coated with the ion-conducting membrane resin in step before drying in step. In other embodiments, one side of the gas-blocking membrane may be coated with the ion-conducting membrane resin in step and then dried in step, and then repeating step by coating the other side of the gas-blocking membrane with the ion-conducting membrane resin and then repeating the drying step.

Further provided herein is an electrolyzer comprising a composite ion exchange membrane of the present disclosure. Electrolyzers and methods of making and procuring electrolyzers are generally known to those having ordinary skill in the art. The electrolyzers generally include an anode and a cathode, wherein the composite ion exchange membrane of the present disclosure is disposed between the anode and cathode and in physical contact with the anode and cathode. Water is provided to the composite ion exchange membrane, and an electric potential across the composite ion exchange membrane causes the water to react, creating hydrogen ions at the anode that flow through the composite ion exchange membrane to the cathode, where the hydrogen ions recombine to form hydrogen gas. The hydrogen gas may then be used for a variety of applications.

Further provided herein is a fuel cell comprising a composite ion exchange membrane of the present disclosure. Fuel cells and methods of making and procuring fuel cells are generally known to those having ordinary skill in the art. The fuel cells generally include an anode and a cathode, wherein the composite ion exchange membrane of the present disclosure is disposed between the anode and cathode and in physical contact with the anode and cathode. Hydrogen gas is provided to the anode-side of the fuel cell and oxygen gas (often in the form of air) is provided to the cathode-side of the fuel cell. An electrical current is generated by a redox reaction of the hydrogen gas, wherein the hydrogen gas separates to form hydrogen ions, which travel through the composite ion exchange membrane to the cathode of the fuel cell, where the hydrogen ions react with the oxygen gas to form water. The electrical current may then be used to provide electricity.

Further provided herein is an electrochemical hydrogen pump comprising a composite ion exchange membrane of the present disclosure. Electrochemical hydrogen pumps and methods of making and procuring electrochemical hydrogen pumps are generally known to those having ordinary skill in the art. The electrochemical hydrogen pumps generally include an anode and a cathode, wherein the composite ion exchange membrane of the present disclosure is disposed between the anode and cathode and in physical contact with the anode and cathode. The hydrogen recirculation pump may generate protons moveable from the anode through the composite ion exchange membrane to the cathode form pressurized hydrogen. Thus, such an electrochemical pump may be particularly useful for recirculating hydrogen within the system at least because the electrochemical pumping provided by the electrochemical pump separates hydrogen from water in the mixture delivered to the hydrogen pump via a pump conduit while also pressurizing the separated hydrogen to facilitate moving the pressurized hydrogen to the inlet portion of a dryer.

ENUMERATED EMBODIMENTS

Embodiment 1: A composite ion exchange membrane comprising: a first layer comprising a first ion-conducting membrane; a second layer comprising a gas-blocking membrane; and a third layer comprising a second ion-conducting membrane, wherein the second layer is disposed between the first layer and the third layer such that a first side of the second layer is in physical contact with the first layer and a second side of the second layer opposite to the first side is in physical contact with the third layer.

Embodiment 2: The composite ion exchange membrane of embodiment 1, wherein the first ion-conducting membrane is a tetrafluoroethylene based fluoropolymer-copolymer.

Embodiment 3: The composite ion exchange membrane of embodiment 2, wherein the tetrafluoroethylene based fluoropolymer-copolymer has the formula $C_7HF_{13}O_5S \cdot C_nF_{2n}$, where n is an integer from 3,000 to 10,000.

Embodiment 4: The composite ion exchange membrane of any one of embodiments 1-3, wherein the second ion-conducting membrane is a tetrafluoroethylene based fluoropolymer-copolymer.

Embodiment 5: The composite ion exchange membrane of embodiment 4, wherein the tetrafluoroethylene based fluoropolymer-copolymer has the formula $C_7HF_{13}O_5S \cdot C_nF_{2n}$, where n is an integer from 3,000 to 10,000.

Embodiment 6: The composite ion exchange membrane of any one of embodiments 1-5, wherein the first layer has a thickness from about 1 micron to about 50 microns.

Embodiment 7: The composite ion exchange membrane of any one of embodiments 1-6, wherein the first layer has a thickness from about 5 microns to about 35 microns.

Embodiment 8: The composite ion exchange membrane of any one of embodiments 1-7, wherein the second layer has a thickness from about 1 micron to about 50 microns.

Embodiment 9: The composite ion exchange membrane of any one of embodiments 1-8, wherein the second layer has a thickness from about 5 microns to about 35 microns.

Embodiment 10: The composite ion exchange membrane of any one of embodiments 1-9, wherein the third layer has a thickness from about 1 micron to about 50 microns.

Embodiment 11: The composite ion exchange membrane of any one of embodiments 1-10, wherein the third layer has a thickness from about 5 microns to about 35 microns.

Embodiment 12: The composite ion exchange membrane of any one of embodiments 1-11, wherein the gas-blocking membrane comprises a sulfonated polymer.

Embodiment 13: The composite ion exchange membrane of embodiment 12, wherein the sulfonated polymer is selected from the group consisting of sulfonated poly(ether ether ketone) (SPEEK), sulfonated phenylated poly(phenylene) (SPPP), sulfonated poly(ether sulfone) (SPES), sulfonated polystyrene-b-poly(ethylene-r-butylene)-b-polystyrene (S-SEBS), mixtures of sulfonated poly(ethylene oxide) mixed with poly(vinyl alcohol), sulfonated polystyrene cross-linked with divinyl benzene, and any combination thereof.

Embodiment 14: The composite ion exchange membrane of any one of embodiments 1-13, wherein the second layer further comprises a catalyst.

Embodiment 15: The composite ion exchange membrane of embodiment 14, wherein the catalyst is in the form of nanoparticles.

Embodiment 16: The composite ion exchange membrane of embodiment 14 or embodiment 15, wherein the catalyst comprises one of platinum, palladium, gold, iridium, osmium, rhodium, ruthenium, silver, or a combination thereof.

Embodiment 17: The composite ion exchange membrane of any one of embodiments 14-16, wherein the catalyst is embedded in a surface of the gas-blocking membrane.

Embodiment 18: The composite ion exchange membrane of any one of embodiments 14-17, wherein the catalyst is dispersed throughout the gas-blocking membrane.

Embodiment 19: The composite ion exchange membrane of any one of embodiments 1-18, wherein the second layer comprises a scaffold.

Embodiment 20: The composite ion exchange membrane of embodiment 19, wherein the scaffold comprises a supporting polymer.

Embodiment 21: The composite ion exchange membrane of embodiment 20, wherein the supporting polymer comprises poly(ether ether ketone) (PEEK).

Embodiment 22: The composite ion exchange membrane of any one of embodiments 1-21, wherein the second layer comprises a plurality of pores on the first side and the second side of the second layer.

Embodiment 23: The composite ion exchange membrane of embodiment 22, wherein the plurality of pores on the first side of the second layer are occupied by the layer and the plurality of pores on the second side of the second layer are occupied by the third layer.

Embodiment 24: The composite ion exchange membrane of any one of embodiments 1-23, wherein the second layer comprises a plurality of channels.

Embodiment 25: The composite ion exchange membrane of embodiment 24, wherein the plurality of channels is occupied by the first layer and the third layer.

Embodiment 26: A method of making a composite ion exchange membrane, the method comprising hot pressing a first layer comprising a first ion-conducting membrane, a second layer comprising a gas-blocking membrane, and a third layer comprising a second ion-conducting membrane, thereby forming the composite ion exchange membrane.

Embodiment 27: The method of embodiment 26, wherein the hot pressing is performed at a temperature from about 100° C. to about 300° C.

Embodiment 28: The method of embodiment 26 or embodiment 27, wherein the hot pressing is performed at a temperature from about 125° C. to about 250° C.

Embodiment 29: The method of any one of embodiments 26-28, wherein the hot pressing is performed at a pressure from about 100 psi to about 3000 psi.

Embodiment 30: The method of any one of embodiments 26-29, wherein the hot pressing is performed at a pressure from about 1000 psi to about 2000 psi.

Embodiment 31: The method of any one of embodiments 26-30, wherein the hot pressing is performed for about 1 minute to about 10 minutes.

Embodiment 32: The method of any one of embodiments 26-31, wherein the hot pressing is performed for about 4 minutes to about 6 minutes.

Embodiment 33: The method of any one of embodiments 26-32, further comprising soaking the gas-blocking membrane in a solution comprising a catalyst before the hot pressing.

Embodiment 34: The method of embodiment 33, wherein the catalyst is in the form of nanoparticles.

Embodiment 35: The method of any one of embodiments 26-34, further comprising spraying the gas-blocking membrane with a solution comprising a catalyst.

Embodiment 36: The method of embodiment 35, wherein the catalyst is in the form of nanoparticles.

Embodiment 37: The method of embodiment 35 or embodiment 36, wherein the spraying is accomplished with an airbrush.

Embodiment 38: The method of embodiment 35 or embodiment 36, wherein the spraying is accomplished via ultrasonic spraying.

Embodiment 39: The method of any one of embodiments 35-38, wherein the spraying creates a coating having a thickness of up to 0.5 microns on the gas-blocking membrane.

Embodiment 40: The method of any one of embodiments 26-39, further comprising spraying the first ion-conducting membrane and/or the second ion-conducting membrane with a solution comprising a catalyst.

Embodiment 41: The method of embodiment 40, wherein the catalyst is in the form of nanoparticles.

Embodiment 42: The method of embodiment 40 or embodiment 41, wherein the spraying is accomplished with an airbrush.

Embodiment 43: The method of embodiment 40 or embodiment 41, wherein the spraying is accomplished via ultrasonic spraying.

Embodiment 44: The method of any one of embodiments 40-43, wherein the spraying creates a coating having a thickness of up to 0.5 microns on the first ion-conducting membrane and/or the second ion-conducting membrane.

Embodiment 45: The method of any one of embodiments 26-44, further comprising adding a catalyst to one or more of the first ion-conducting membrane, the gas-blocking membrane, and the second ion-conducting membrane by: immersing the first ion-conducting membrane, the gas-blocking membrane, or the second ion-conducting membrane in a solution comprising a metallic salt of the catalyst; and reducing the metallic salt of the catalyst in situ.

Embodiment 46: A method of making a composite ion exchange membrane, the method comprising: casting a first layer solution onto a substrate, the first layer solution comprising a first ion-conducting membrane resin; drying the first layer solution to form a first layer; casting a second layer solution onto the first layer, the second layer solution comprising a gas-blocking membrane resin; drying the second layer solution to form a second layer; casting a third layer solution onto the second layer, the third layer solution comprising a second ion-conducting membrane resin; and drying the third layer solution to form a third layer, thereby forming the composite ion exchange membrane.

Embodiment 47: The method of embodiment 46, wherein the drying occurs at a temperature from about 50° C. to about 100° C.

Embodiment 48: The method of embodiment 46 or embodiment 47, wherein the drying occurs at a temperature of about 75° C.

Embodiment 49: The method of any one of embodiments 46-48, wherein the drying occurs over night.

Embodiment 50: The method of any one of embodiments 46-49, further comprising spraying the gas-blocking membrane with a solution comprising a catalyst.

Embodiment 51: The method of embodiment 50, wherein the catalyst is in the form of nanoparticles.

Embodiment 52: The method of embodiment 50 or embodiment 51, wherein the spraying is accomplished with an airbrush.

Embodiment 53: The method of embodiment 50 or embodiment 51, wherein the spraying is accomplished via ultrasonic spraying.

Embodiment 54: The method of any one of embodiments 50-53, wherein the spraying creates a coating having a thickness of up to 0.5 microns on the gas-blocking membrane.

Embodiment 55: The method of any one of embodiments 46-54, further comprising placing a scaffold on the first layer prior to casting the second layer solution.

Embodiment 56: The method of any one of embodiments 46-55, further comprising adding a catalyst to one or more of the first ion-conducting membrane, the gas-blocking membrane, and the second ion-conducting membrane by: immersing the first ion-conducting membrane, the gas-blocking membrane, or the second ion-conducting membrane in a solution comprising a metallic salt of the catalyst; and reducing the metallic salt of the catalyst in situ.

Embodiment 57: An electrolyzer comprising a composite ion exchange membrane of any one of embodiments 1-25.

Embodiment 58: A fuel cell comprising a composite ion exchange membrane of any one of embodiments 1-25.

Embodiment 59: An electrochemical hydrogen pump comprising a composite ion exchange membrane of any one of embodiments 1-25.

Embodiment 60: A method for making a composite ion exchange membrane, the method comprising: providing a gas-blocking membrane including a first side and a second side opposite to the first side; forming pores or channels in the gas-blocking membrane; coating an ion-conducting membrane resin onto the first side of the gas-blocking layer and onto the second side of the gas-blocking layer, thereby forming the composite ion exchange membrane.

Embodiment 61: The method of embodiment 60, wherein the step of forming pores or channels in the gas-blocking membrane is accomplished using an optical laser.

Embodiment 62: The method of embodiment 60 or embodiment 61, wherein the step of forming pores or channels in the gas-blocking membrane comprises: coating a pore-former composition onto the first side of the gas-blocking membrane and the second side of the gas-blocking membrane; and removing the pore former from the gas-blocking membrane, thereby creating a porous gas-blocking membrane.

Embodiment 63: The method of embodiment 62, wherein the pore-former composition comprises a gas-blocking ion conducting membrane resin and a pore-former.

Embodiment 64: The method of embodiment 63, wherein the pore-former comprises polystyrene, a derivative of polystyrene, polyethylene oxide, a derivative of polyethylene oxide, polyvinylidene fluorine, a derivative of polyvinylidene fluorine, carbon black, silica, polyacrylic acid, N-(2-hydroxypropyl) meth acrylamide (HPMA), polyacrylamide (PAM), or a combination thereof.

Embodiment 65: The method of any one of embodiments 62-64, wherein the pore-former and the gas-blocking ion conducting membrane resin are present in the pore-former composition in a weight ratio from about 50:50 to about 90:10 of pore-former to gas-blocking ion conducting membrane resin.

Embodiment 66: The method of any one of embodiments 62-65, further comprising drying the gas-blocking membrane after the step of coating the pore-former composition.

Embodiment 67: The method of embodiment 66, wherein the drying step is conducted at a temperature from about 25° C. to about 120° C.

Embodiment 68: The method of any one of embodiments 62-67, wherein the coated pore-former composition has a thickness from about 5 µm to about 20 µm on each side of the gas-blocking membrane.

Embodiment 69: The method of any one of embodiments 60-68, further comprising drying the ion-exchange resin after the step of coating the ion-conducting membrane resin.

Embodiment 70: The method of embodiment 69, wherein the drying step is conducted at a temperature from about 25° C. to about 120° C.

Embodiment 71: The method of any one of embodiments 60-70, further comprising adding a catalyst to the gas-blocking membrane, comprising: immersing the gas-blocking membrane in a solution comprising a metallic salt of the catalyst; and reducing the metallic salt of the catalyst in situ.

Embodiment 72: A method for making a composite ion exchange membrane, the method comprising: providing a gas-blocking membrane including a first side and a second side opposite to the first side; coating a pore-former composition onto the first side of the gas-blocking membrane and the second side of the gas-blocking membrane; removing the pore former from the gas-blocking membrane, thereby creating a porous gas-blocking membrane; coating an ion-exchange resin onto the first side of the gas-blocking layer and onto the second side of the gas-blocking layer, thereby forming the composite ion exchange membrane.

Embodiment 73: A method for making a composite ion exchange membrane, the method comprising: immersing a gas-blocking ion-conducting membrane resin comprising a first solvent in a nonsolvent, such that the nonsolvent displaces the first solvent in the gas-blocking ion-conducting membrane resin; drying the gas-blocking ion-conducting membrane resin to form a gas-blocking membrane comprising a first side and a second side, wherein the gas-blocking membrane comprises a plurality of pores on the first side and a plurality of pores on the second side, or a plurality of channels; and coating an ion-conducting membrane resin onto the first side of the gas-blocking membrane and onto the second side of the gas-blocking membrane, thereby forming the composite ion exchange membrane.

EXAMPLES

Example 1

Properties of sulfonated polymers suitable for use in the gas-blocking membranes of the present disclosure are presented in Table 1 below.

TABLE 1

Properties of Sulfonated Polymers
for use in Gas-Blocking Membranes

| Layer | Ion-exchange capacity (IEC) (meq/g) | Ionic conductivity (mS/cm) |
|---|---|---|
| Sulfonated poly(ether ether ketone) (SPEEK) | 1.15 | 120 |
| Sulfonated phenylated poly(phenylene) (sPPP) | 2.8-3.1 | 90 |
| Sulfonated poly(ether sulfone) (SPES) | 1.15 | 27 |
| Sulfonated polystyrene-b-poly(ethylene-r-butylene)-b-polystyrene (S-SEBS) | 1.8 | 35.5 |
| Selemion ™ CMV | 0.8 | 45 |
| Neosepta ™ CMS | 1.5 | 22 |
| Fumasep ™ FKS 30 | 1.43 | 123 |

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A composite ion exchange membrane comprising:
a first layer comprising a first ion-conducting membrane cast from an ion-conducting membrane resin;
a second layer comprising a gas-blocking membrane cast from a gas-blocking membrane resin; and
a third layer comprising a second ion-conducting membrane cast from an ion-conducting membrane resin, wherein the second layer is disposed between the first layer and the third layer such that a first side of the second layer is in physical contact with the first layer and a second side of the second layer opposite to the first side is in physical contact with the third layer.

2. The composite ion exchange membrane of claim 1, wherein the first ion-conducting membrane is a tetrafluoroethylene based fluoropolymer-copolymer.

3. The composite ion exchange membrane of claim 2, wherein the tetrafluoroethylene based fluoropolymer-copolymer has the formula $C_7HF_{13}O_5S \cdot C_nF_{2n}$, where n is an integer from 3,000 to 10,000.

4. The composite ion exchange membrane of claim 1, wherein the second ion-conducting membrane is a tetrafluoroethylene based fluoropolymer-copolymer.

5. The composite ion exchange membrane of claim 4, wherein the tetrafluoroethylene based fluoropolymer-copolymer has the formula $C_7HF_{13}O_5S \cdot C_nF_{2n}$, where n is an integer from 3,000 to 10,000.

6. The composite ion exchange membrane of claim 1, wherein the first layer has a thickness from about 1 micron to about 50 microns.

7. The composite ion exchange membrane of claim 1, wherein the second layer has a thickness from about 1 micron to about 50 microns.

8. The composite ion exchange membrane of claim 1, wherein the third layer has a thickness from about 1 micron to about 50 microns.

9. The composite ion exchange membrane of claim 1, wherein the gas-blocking membrane comprises a sulfonated polymer.

10. The composite ion exchange membrane of claim 9, wherein the sulfonated polymer is selected from the group consisting of sulfonated poly(ether ether ketone) (SPEEK), sulfonated phenylated poly(phenylene) (SPPP), sulfonated poly(ether sulfone) (SPES), sulfonated polystyrene-b-poly (ethylene-r-butylene)-b-polystyrene (S-SEBS), mixtures of sulfonated poly(ethylene oxide) mixed with poly(vinyl alcohol), sulfonated polystyrene cross-linked with divinyl benzene, and any combination thereof.

11. The composite ion exchange membrane of claim 1, wherein the second layer further comprises a catalyst.

12. The composite ion exchange membrane of claim 11, wherein the catalyst is embedded in a surface of the gas-blocking membrane.

13. The composite ion exchange membrane of claim 11, wherein the catalyst is dispersed throughout the gas-blocking membrane.

14. The composite ion exchange membrane of claim 1, wherein the second layer comprises a scaffold including a supporting polymer.

15. The composite ion exchange membrane of claim 1, wherein the second layer comprises a plurality of pores on the first side and the second side of the second layer.

16. The composite ion exchange membrane of claim 15, wherein the plurality of pores on the first side of the second layer are occupied by the layer and the plurality of pores on the second side of the second layer are occupied by the third layer.

17. The composite ion exchange membrane of claim 1, wherein the second layer comprises a plurality of channels.

18. The composite ion exchange membrane of claim 17, wherein the plurality of channels is occupied by the first layer and the third layer.

* * * * *